United States Patent
Lynn et al.

(10) Patent No.: US 8,312,987 B2
(45) Date of Patent: Nov. 20, 2012

(54) BELT MONITORING SYSTEMS AND METHODS

(75) Inventors: David Lynn, Portrush (GB); Graeme Knox, Oxford, MI (US); Carl Wacker, Oxford, MI (US); Ralph Moffett, Ortonville, MI (US); William Stewart, County Autrim (GB); Idir Boudaoud, Antibes (FR); Alan Kenneth McCall, Co. Antrim (GB); Dave Hanes, Troy, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 12/009,097

(22) Filed: Jan. 16, 2008

(65) Prior Publication Data
US 2009/0178902 A1    Jul. 16, 2009

(51) Int. Cl.
| F16G 1/00 | (2006.01) |
| F16G 5/00 | (2006.01) |
| F16G 1/04 | (2006.01) |
| F16G 1/28 | (2006.01) |
| G01M 15/00 | (2006.01) |

(52) U.S. Cl. .................. 198/810.02; 474/260; 474/263; 474/268; 474/202; 73/117.02

(58) Field of Classification Search ................. 198/810, 198/811, 812; 73/119, 116, 119 R
See application file for complete search history.

(56) References Cited

U.S. PATENT DOCUMENTS

| 3,745,440 | A | * | 7/1973 | Lord | 363/17 |
| 4,767,389 | A | | 8/1988 | Habegger et al. | 474/266 |
| 4,845,429 | A | * | 7/1989 | Burreson | 324/234 |
| 5,807,194 | A | | 9/1998 | Knutson et al. | 474/268 |
| 6,523,400 | B1 | * | 2/2003 | Ahmed | 73/114.77 |
| 6,532,810 | B1 | | 3/2003 | Ahmed | 73/119 R |
| 6,695,733 | B2 | * | 2/2004 | Knutson | 474/260 |
| 6,715,602 | B1 | | 4/2004 | Gartland | 198/810.02 |
| 7,621,114 | B1 | * | 11/2009 | Bigler | 59/84 |

FOREIGN PATENT DOCUMENTS
WO    WO 2007/109896 A1    4/2007

OTHER PUBLICATIONS

Nondestructive Testing Center; Impedence, http://www.ndt-ed.org/EducationResources/CommunityCollege/EddyCurrents/Physics/impedance.htm.*
Merriam-Webster Dictionary Online; impedance definition, http://www.merriam-webster.com/dictionary/impedance.*

* cited by examiner

Primary Examiner — Gene Crawford
Assistant Examiner — Yolanda Jones
(74) Attorney, Agent, or Firm — J. A. Thurnau, Esq.; P. N. Dunlap, Esq.

(57) ABSTRACT

A belt monitoring system employs a belt having at least one reinforcement member made from a conductive reinforcement material. A belt monitor is disposed in conjunction with the belt. The belt monitor comprises a field inductor excited by an applied signal. An electrical characteristic of at least a portion of the field inductor as influenced by changes in the electrical properties of the conductive reinforcement member is monitored in order to determine a physical condition of the conductive reinforcement member and thereby monitor a physical characteristic of the belt. This monitoring may be carried out by a sense inductor disposed adjacent or in conjunction with the field inductor.

17 Claims, 7 Drawing Sheets

BELT MONITORING SYSTEMS AND METHODS

BACKGROUND OF THE INVENTION

1. Field of the Invention

This invention relates generally to power transmission belts, more specifically to systems and methods for monitoring a condition of such a belt, and particularly to belt monitor systems and methods for monitoring a belt that has a conductive reinforcement member.

2. Description of the Prior Art

Prior attempts to monitor the condition of power transmission belts or the like have required special modifications to the belt. For example, Gartland, U.S. Pat. No. 6,715,602 teaches incorporation of at least one dedicated sensor containing an endless loop to be purposely embedded into a conveyor belt in order to facilitate the detection and location of a rip in a conveyor belt. As another example, two patents issued to Ahmed, U.S. Pat. Nos. 6,523,400 and 6,532,810, teach the use of a dedicated closed loop wire or strip which is required to be embedded in a belt to facilitate detection of a break in the closed loop. In both cases embedding such sensors is expensive and requires special production methods and additional materials which are extraordinary to the normal use of the belt.

SUMMARY

The present invention is directed to systems and methods for sensing a condition of a power transmission belt, conveyor belt, or the like. More particularly, embodiments of the present invention relate to monitoring a physical characteristic of a belt by propagating electromagnetic waves into an existing conductive reinforcement member within the belt. The present invention avoids the use of an invasive sensor that can compromise the robustness, integrity and strength of a belt, which can negatively impact on the performance of the belt in its intended application.

An embodiment of a belt monitor system might include a belt having at least one reinforcement member preferably made from a conductive material such as carbon fiber cord, or the like. The incorporation of carbon fiber into power transmission belts as reinforcement is discussed in commonly owned U.S. Pat. Nos. 5,807,194 and 6,695,733 which are hereby incorporated herein by reference. Alternatively or additionally, such a reinforcement member may comprise other reinforcement materials in addition to the conductive material, such as in a hybrid carbon and glass composite belt. A system of the present invention preferably also includes a belt monitor, which may be disposed in conjunction with the belt. Such a belt monitor preferably includes a field inductor such as for example a pressed iron ferrite core inductor, which may be excited by an applied signal such as a voltage signal, resulting in the generation of an electromagnetic field. An iron ferrite core inductor may be torroidal or U-shaped. If the inductor core is torroidal, then it is preferably split. The electromagnetic field may be influenced by changes in the electrical properties of the reinforcement member in the belt. These changes in the electrical properties of the reinforcement member in the belt may be a result of changes in the physical condition of the belt such as damage, breaks, fractures, fatigue, changes in temperature and/or the like. The influence of these changes may manifest as changes in the electromagnetic field which may be further manifested in the electrical properties of the field inductor.

Measurements of an electrical characteristic of at least a portion of the field inductor may be made using a sense inductor, which may be disposed adjacent to the field inductor, for example around the core of a pressed iron ferrite core field inductor. Such measurements may include, without limitation, measurement of such electrical properties as the magnitude of current flowing in the field inductor, the change in waveform symmetry of the voltage in the field inductor, the phase difference between the voltage and current in the field inductor, and/or the magnitude of magnetic flux in the field inductor. Such measurements may be achieved by employing, for example a data acquisition process including digital signal processing (DSP) or the like.

An embodiment of the belt monitor system may monitor the condition of a belt such as may be used on a motor vehicle, such as a timing belt or an accessory drive belt, a continuously variable transmission (CVT) belt, v-belt (including a carbon v-belt), fan belt, carbon-fiber-reinforced thermoplastic polyurethane (TPU) belt, thermoset/elastomeric belts, endless belts, long length belting, and/or the like. Alternatively, the belt monitor system may be used in conjunction with belts in industrial applications such as in a static machine, a drive mechanism, a conveyor belt, and/or the like. The belt preferably contains a conductive fiber such as carbon fiber or carbon cord which may be integral to the belt and may extend longitudinally through at least a portion of the belt, providing reinforcement of the belt. Since the field inductor, as described above, is preferably disposed adjacent to the belt containing the conductive reinforcement fiber, the fiber may impact on the electromagnetic field generated by exciting the field inductor. Changes in the condition of the belt, for example wear of the belt, stress on the belt, stress on the fibers in the belt, change in temperature of the belt, degradation of the belt material and/or the like, may manifest as changes in the electromagnetic field generated by the field inductor. The changes in the electromagnetic field may manifest as changes in the electrical characteristics of the field inductor such as changes in the impedance of the field inductor, the magnitude of current flowing in the field inductor, the waveform symmetry of the voltage in the field inductor, the phase difference between the voltage and current in the field inductor, the magnitude of magnetic flux in the field inductor and/or the like.

In operation a system such as described above may employ a method for monitoring a belt, which includes the steps of disposing a field inductor proximate to a belt that has at least one conductive reinforcement member; exciting the field inductor by passing a current through it in order to generate an electromagnetic field; disposing a sense inductor adjacent to the field inductor, the belt and the electromagnetic field; measuring an electrical parameter of the sense inductor as impacted by the electromagnetic field influenced by physical parameters of the belt; and determining from the measured electrical parameter of the sense inductor a physical condition of the belt.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
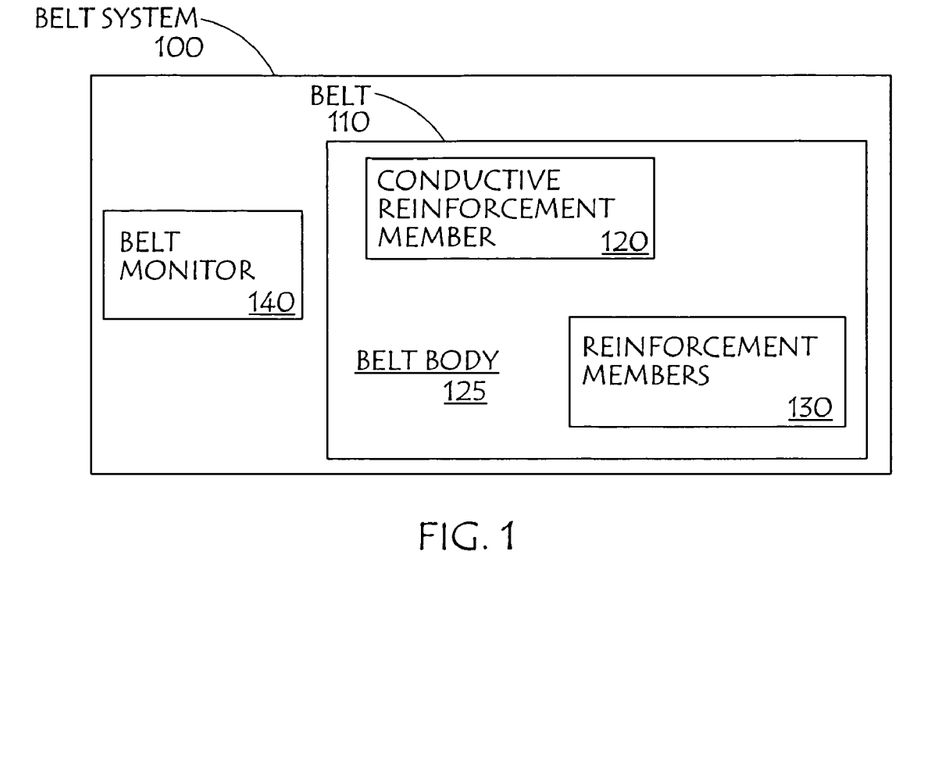
FIG. 1 is diagrammatic illustration of an embodiment of belt monitoring system.
Figure 2:
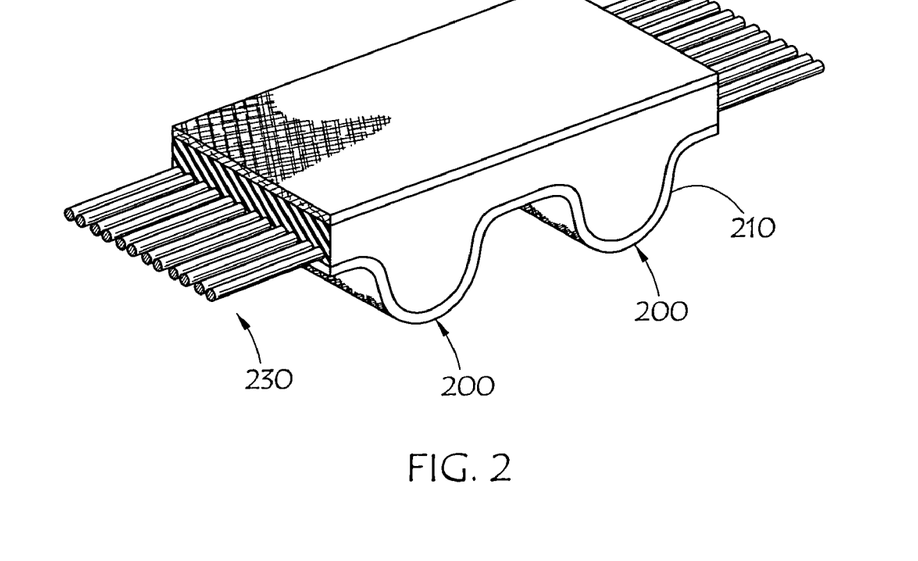
FIG. 2 is fragmented view of an example of a belt with teeth.
Figure 5:
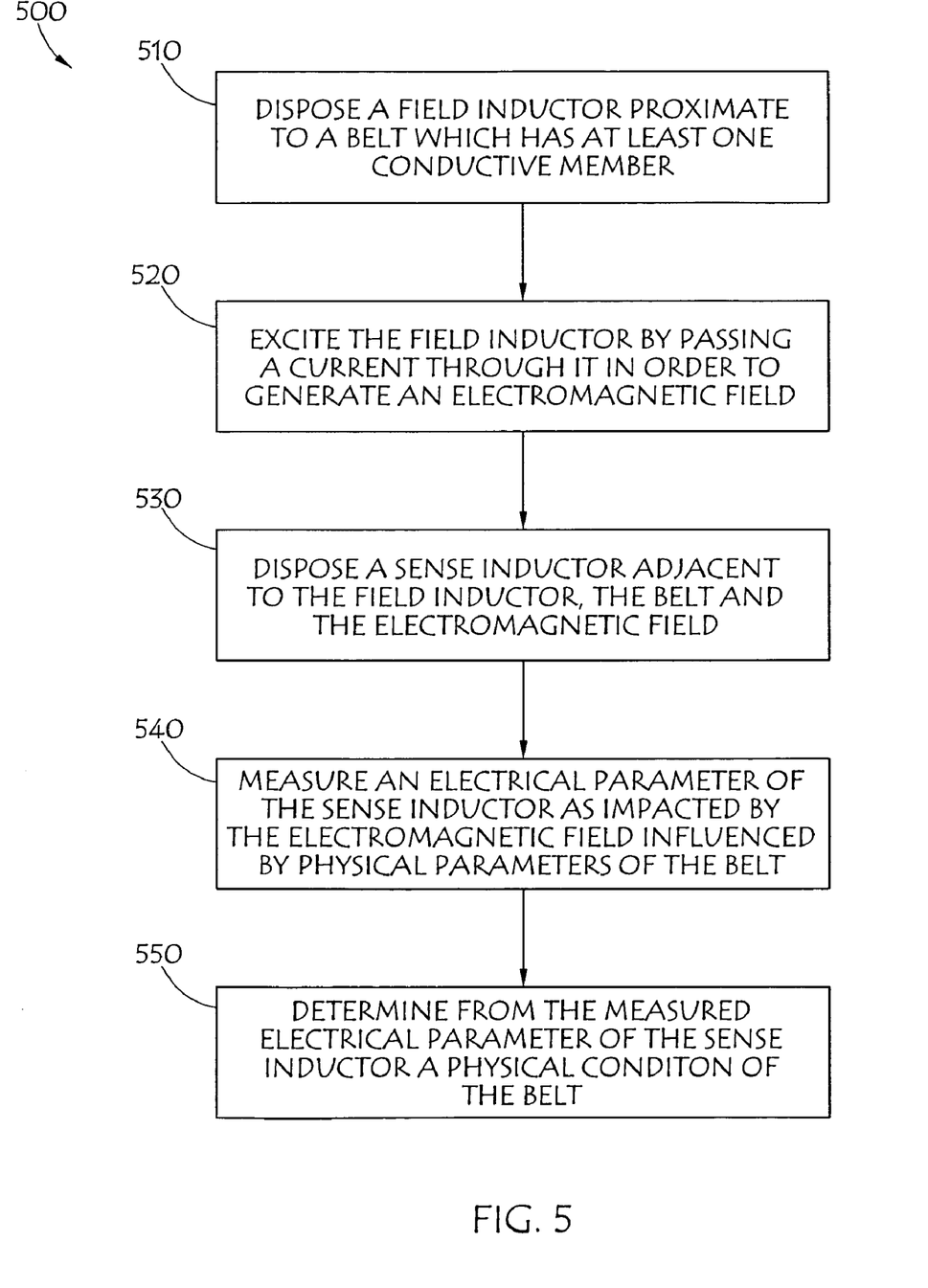
FIG. 5 is a flowchart of an embodiment of a method of detecting belt condition.

The present invention is directed to systems and methods such as illustrated in FIGS. 1 and 5, respectively, for sensing the condition of a belt, such as the power transmission belt shown in FIG. 2, a conveyor belt, or the like. More particularly, embodiments of the present invention relate to monitoring a physical condition of the belt by propagating electromagnetic waves into a reinforcement member within the belt, as discussed in greater detail below.

Turning to FIG. 1, an embodiment of belt monitor system 100 might include belt 110 having a reinforcement member 120 preferably made from a conductive material such as for example carbon fiber, carbon cord and/or the like. Such conductive reinforcement member 120 may be blended or otherwise incorporated with other belt reinforcement members 130, which may be for example, twisted or braided cords, woven or nonwoven fabrics, or the like made from such materials as for example polyamide, aramid, polyurethane, nylon, glass, acrylic, and/or polyester, which may or may not also be conductive. For example, such conductive reinforcement member 120 may be blended into existing woven fabrics within belt 110, which may be disposed on at least a portion of a surface, such as a pulley contact surface or back surface, of belt 110. Alternatively, such conductive reinforcement member 120 may be woven into a back fabric, cross-cord fabric, or any embedded fabric layer of belt 110, or otherwise disposed integral to belt 110. Alternatively, a conductive reinforcement member 120 may be incorporated, embedded, or blended into belt body material 125 which may be based on, for example, plastic, elastomer, rubber, polyurethane or the like and may include, for example, fillers, fibers, curatives, and/or any number of various additives. In accordance with certain embodiments of the present invention, member 120 may be a continuous carbon fiber filament of any desired diameter, or one or more carbon fiber filaments having diameters in the range of five to nine microns.

Conductive reinforcement member 120 preferably extends longitudinally through at least a portion of belt 110. Alternatively, member 120 may extend along the entire length of belt 110 or further extend to multiple turns along the entire length of belt 110. Member 120 preferably provides a conductive path through at least a portion of belt 110. This conductive path may be made up of a plurality of conductive reinforcement members 120. Alternatively or additionally, member 120 (or at least a portion of member 120) may be laterally disposed, extending across at least a portion of belt 110, thereby providing reinforcement along the lateral axis of the belt. Turning to FIG. 2, for example, member 120 may be disposed in or adjacent to teeth 200. Also, tooth fabric 210 may include a compound or material used in the belt or an adhesive treatment. Tooth fabric 210 may be a laminate or composite material. For example, tooth fabric 210 may comprise a conductive layer, such as a layer having a conductive coating, a conductive film, and/or the like. Additionally, such a conductive layer may cover most, if not all, of the exposed surface of the belt. "Back cracking" and other indications of belt aging and wear may be detected in such conductively coated belts in accordance with the present invention. As another example, twisted cord 230 may be a glass/carbon hybrid. Alternatively or additionally, conductive members may comprise a combination of lateral and longitudinal reinforcement cords integrated into belt 110, and/or the like.

The present systems also preferably include belt monitor 140, which is preferably disposed in conjunction with belt 110, such as immediately adjacent a span of belt 110. An embodiment of belt monitor 140 such as diagrammatically illustrated in FIG. 3 might include microcontroller 310 and temperature sensor 320. Belt monitor 140 also preferably includes field inductor 330, which may be for example a split-core, ferrite coil inductor or the like. Field inductor 330 is preferably disposed in conjunction with belt 110, such as illustrated in FIG. 4, disposed over belt 110. An iron ferrite core inductor may be torroidal or U-shaped. If the inductor core is torroidal, then it is preferably split to allow disposition of the field inductor around a span of the belt.

In operation, field inductor 330 may be excited by an applied signal, such as a voltage signal, at 520 of FIG. 5 which is a flowchart of embodiment 500 of a method for detecting belt condition. This signal may be employed at a terminal of field inductor 330 and may be a bipolar signal such as for example alternating current voltage waveform signal, varying direct current waveform signal or the like. The application of a voltage will preferably result in the generation of electromagnetic field 410 by field inductor 330.

A transformer may comprise a primary and secondary winding. Typically such a transformer exhibits a phase difference between the voltage and current signals of the primary and secondary winding approaching ninety degrees where the secondary winding has impedance approaching infinity, known as an open turn winding. Alternatively, when the impedance of the secondary winding approaches zero, the aforementioned phase difference also approaches zero degrees. In one embodiment of the present invention the field inductor acts like the primary winding of a transformer. The belt disposed in conjunction with the field inductor, as described at 510, presents to the field inductor as a secondary winding loading the primary winding. The physical characteristics of the belt as impacted by the physical condition of the conductive member and/or members present in the belt will impact on the generated electromagnetic field contributing to the load presented by the belt to the primary winding. A belt in good or perfect condition may present as a lower impedance than that of a belt which has a condition resultant from wear, damage, stress, degradation, and/or the like.

In certain embodiments of the present invention it is preferable that Electromagnetic field 410 is influenced by changes in electrical properties of reinforcement member 120 in belt 110, which may be a result of changes in physical condition of belt 110. The influence of these changes may manifest as changes in electromagnetic field 410 and may be measured as described at 540 in FIG. 5. Influence of these changes may be further manifested in the electrical properties of field inductor 330. For example, damage to structure of belt 110 may manifest as a change in impedance of belt 110. Therefore, in the example given above when belt 110 acts as a secondary winding, impedance changes on the secondary winding may be a result of damage to belt 110. Such damage, might take the form of damage to the body of belt 110, to teeth 200 on a belt, to reinforcement member 120, or to other materials in a belt, such as discussed above.

Figure 3:
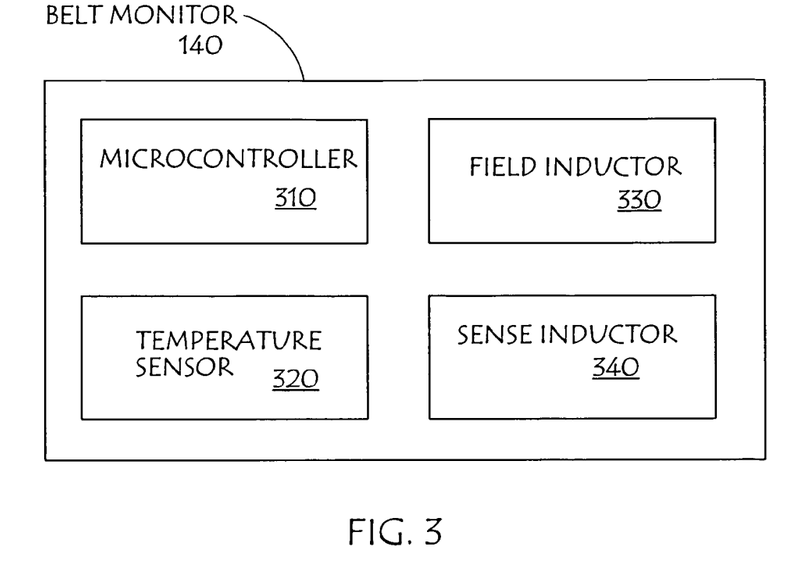
FIG. 3 is a diagrammatic illustration of an embodiment a belt monitor.
Figure 4:
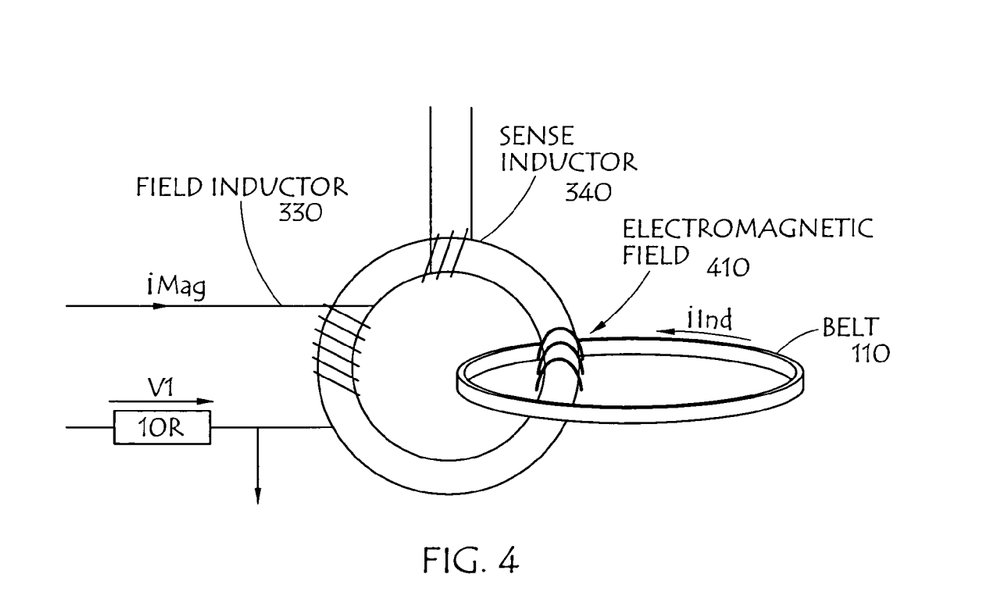
FIG. 4 is a more detailed diagrammatic illustration of the structure of an embodiment a belt monitor.

Belt monitor 140 may further include sense inductor 340 such as shown in the illustrated embodiments of FIGS. 3 and 4. Sense inductor 340 may be disposed adjacent to field inductor 330, so as to share a common core as shown in the embodiment in FIG. 4. As pointed out at 550, in the flowchart of FIG. 5, physical condition of the belt may determine from the measured electrical parameter of the sense inductor. More particularly, measurements of an electrical characteristic of at least a portion of field inductor 330 may be made using sense inductor 340. Such measurements may include measurement of such electrical properties as the magnitude of current flowing in field inductor 330, the change in waveform symmetry of the voltage in field inductor 330, the phase difference between the voltage and current in field inductor 330, the magnitude of magnetic flux in field inductor 330, and/or the like.

The phase difference between the voltage and current in field inductor 330 where a bipolar applied voltage, for example a sinusoidal source voltage, will have a phase difference of ninety degrees. That is, the current through the primary winding of a transformer lags the voltage by ninety degrees. The current induced in belt 110 by its proximity to electromagnetic field 410 is generally lagging that of a voltage applied to field inductor 330 by ninety degrees, so too is the induced voltage or back electromagnetic field (EMF) present in inductor 330. When a load is applied to a secondary winding (belt 110), such as a change in impedance as a result of changes in the physical characteristics of belt 110 and/or reinforcement member 120, a current is drawn by the load. This current being drawn is reflected, through the transformer, onto the primary winding (field inductor 330). As a result, field inductor 330 draws more current from the applied voltage source. As the transformer approaches full power the original ninety degree phase shift becomes less and less and this can be used to determine a change in the physical properties of belt 110 and/or reinforcement member 120 in accordance with the present systems and methods.

In accordance with various embodiments of the present invention, the magnitude of the magnetic flux in the ferrite core of an embodiment of field inductor 330 may be measured using sense inductor 340. Changes in magnetic flux are related to the load applied by impedance of belt 110 and representative of damage to belt 110 and/or reinforcement member 120. Belt monitor 140 may be calibrated to store and/or compensate for any existing conditions internal or external to belt 110 such as ambient temperature, humidity, pressure and/or the like.

Figure 6:
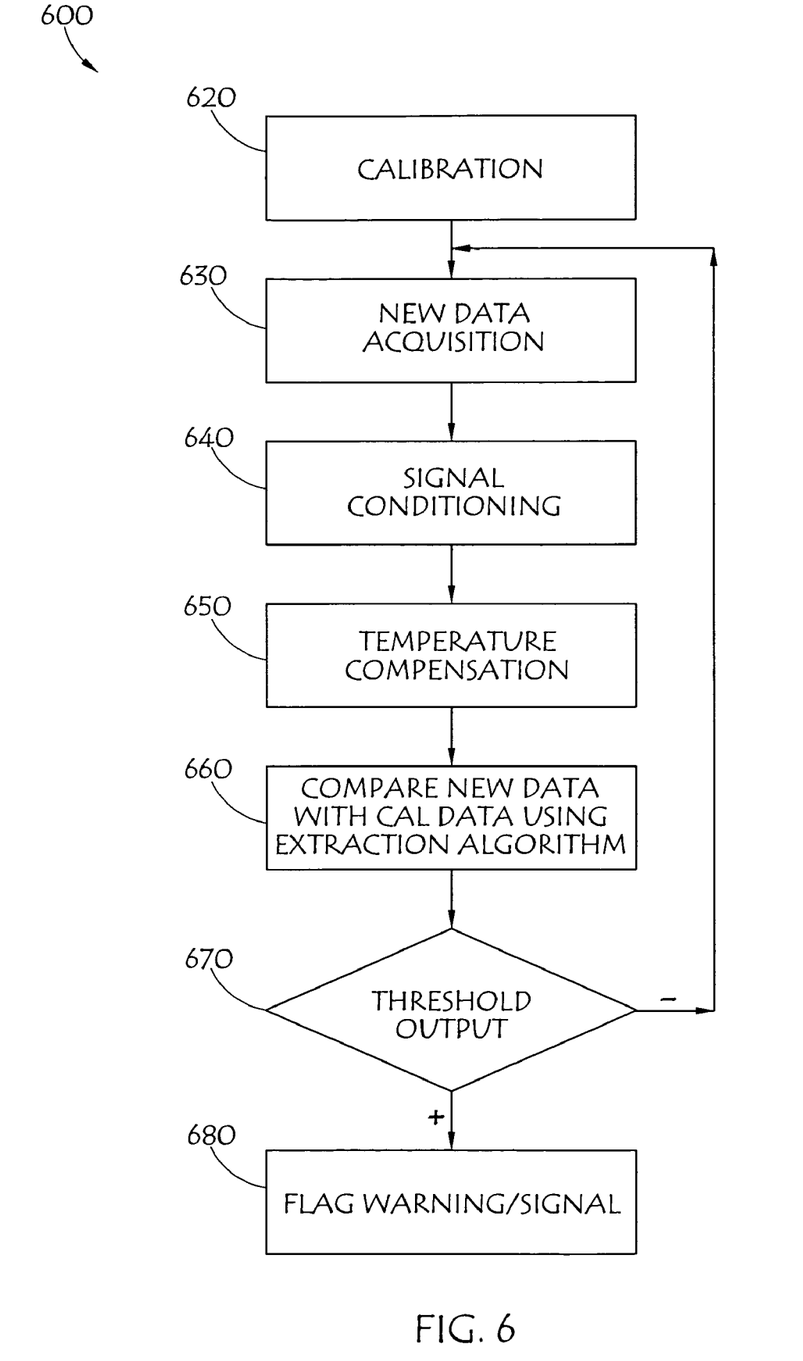
FIG. 6 is a flowchart of an embodiment of a digital signal processing process that may be employed in the present systems and methods.
Figure 7:
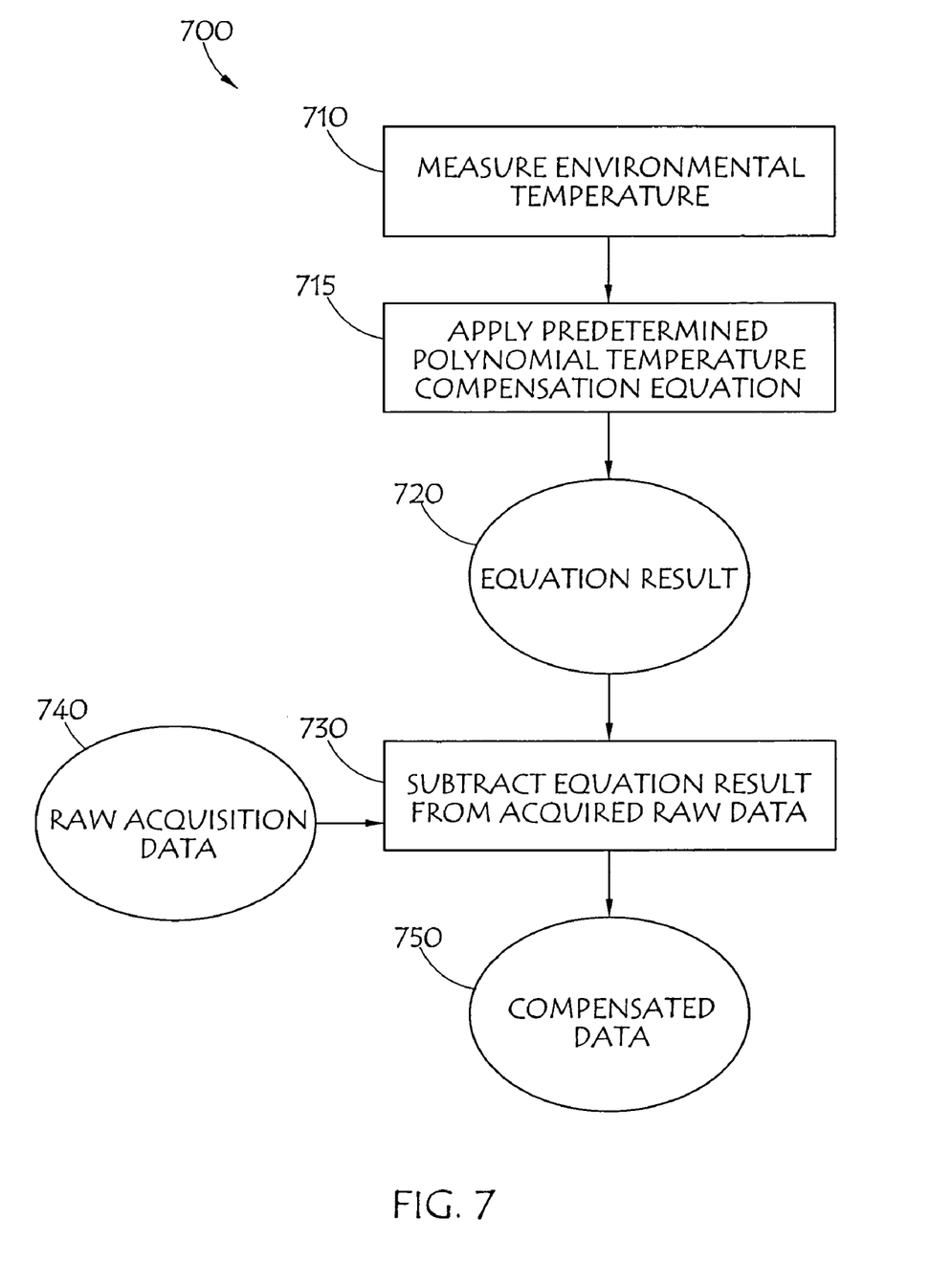
FIG. 7 is a flowchart of an embodiment of a temperature adjustment process that may be employed in the present systems and methods.
Figure 8:
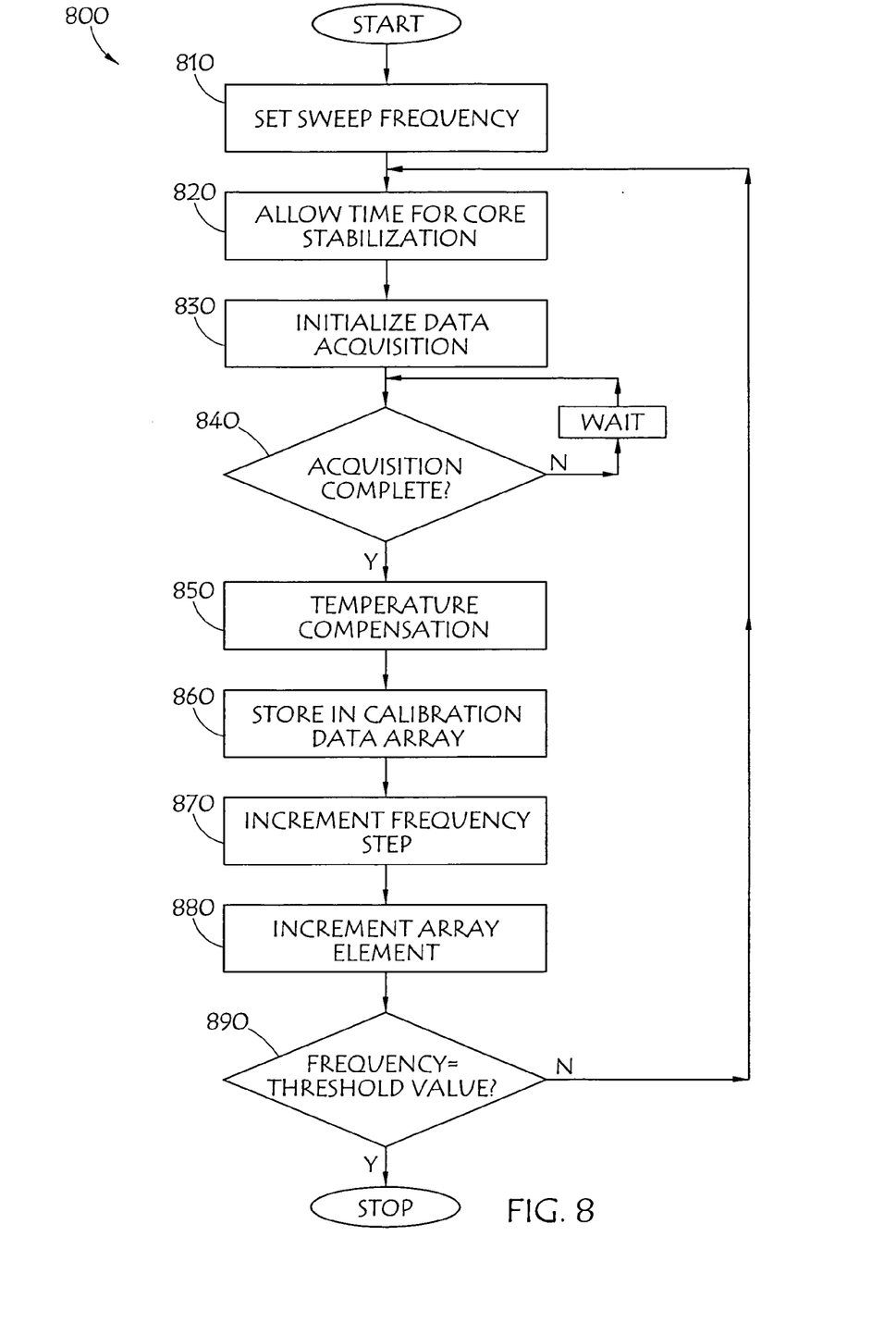
FIG. 8 is a flowchart of an embodiment of a calibration/data acquisition process that may be employed in the present systems and methods; and, FIG. 9 is a flowchart of an embodiment of an extraction algorithm that may be employed in the present systems and methods.

In accordance with various embodiments, a change in waveform symmetry of field inductor 330 may be detected and measured through use of one or more digital signal processing (DSP) pattern comparison techniques. An example of embodiment 600 of such a comparison technique is illustrated in FIG. 6, and may include detecting a signal across sense inductor 340 at 630, for example by employing a 16-bit, sigma-delta, analogue to digital converter. Conditioning 640 of the signal, for example using a full wave rectification, may preserve signal fidelity. Such a signal may be a function of frequency and may be stored in a multidimensional array, or the like. The detected and/or conditioned signal may be adjusted for a measured temperature at 650. Embodiment 700 of such an adjustment process is illustrated in FIG. 7. Subsequent data may be acquired and compared to a calibration data set at 660. This data may be stored in a nonvolatile memory block. Data acquisition and comparison at 660 may be achieved using a calibration and data acquisition process. An example of such a process is illustrated in FIG. 8. At 670, if the conditioned and temperature compensated data value is less than a threshold value that would indicate belt damage, the flow of DSP process 600 returns to 630 and acquires new data. However, if at 670 the conditioned and temperature compensated data value is greater than a threshold value that would indicate belt damage, a warning may be issued at 680.

FIG. 7 is a flowchart of embodiment 700 of a temperature adjustment process that may be employed in DSP process 600, at step 650. At 710 an environmental temperature is measured. At 715 a polynomial temperature compensation equation is applied to the measured temperature. The equation result produced at 720 is subtracted from raw acquisition data from 740 at 730. The compensated data resulting at 750 may be supplied to DSP process 600 for use at 650.

FIG. 8 is a flowchart of an embodiment of calibration/data acquisition process 800 that may be employed on the data used in DSP flow 600 in FIG. 6. At 810 a sweep frequency is set. At 820 time may be allotted to allow stabilization of the core of field inductor 330. Data acquisition is initialized at 830. At 840 a determination is made at 840 as to whether the data acquisition is complete, if not a wait state is initiated. If the data acquisition is complete at 840, temperature compensation 700 is carried out at step 850. At 860 the temperature compensated data from 860 is stored in a calibration data array at 860. At 870, the sweep frequency is incremented at 870 and at 880 the array element is incremented. At 890, a determination is made at 890 as to whether the incremented frequency is equal to a threshold value. If not, calibration/data acquisition process returns to 820. If the incremented frequency does equal the threshold value calibration/data acquisition process 800 ends.

Figure 9:
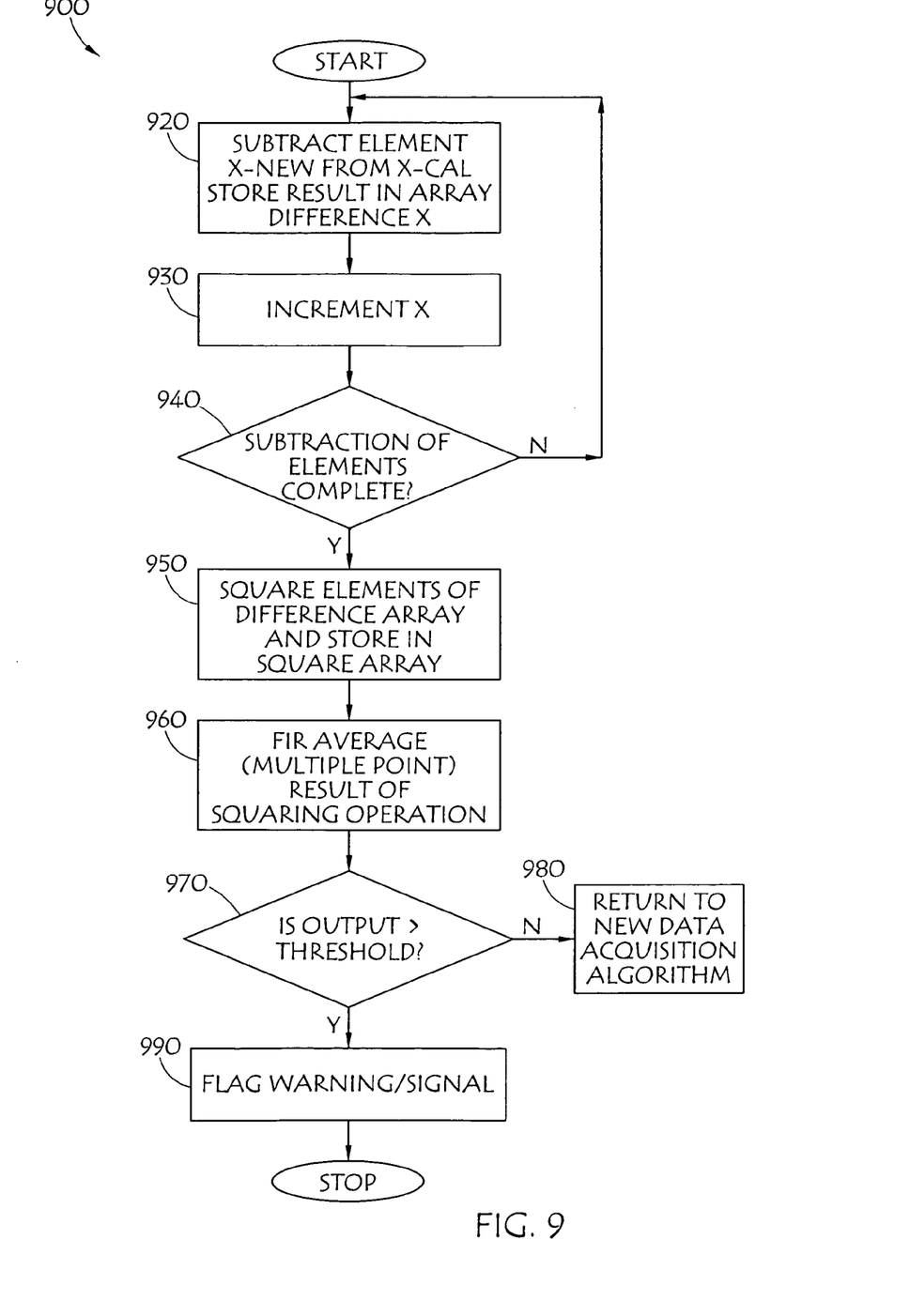

FIG. 9 is a flowchart of embodiment 900 of an extraction algorithm that may be employed as a part of Data acquisition and calibration process 800. At 920 a difference array showing, for example the rate of change between the calibration data and any subsequently acquired data is constructed at 920. The difference array, any calibration or subsequently acquired data may include information relating to frequency, amplitude, waveform symmetry of the signal and/or the like. For example, at 920 a newly acquired array element X may be subtracted from a calibrated X element and the result may be stored as difference X. Then at 930 array element X may be incremented. Once it is determined at 940 that subtraction of elements in 920 is complete. Data may be extracted from the difference array and the difference array may be modified. For example, the contents may be squared at 950 in such a manner as to provide squared modulus data. Such data may advantageously increase perceived magnitude, thereby facilitating better detection of small changes. A multiple point rolling average, for example a twenty (20) point rolling average may be obtained 960 by employing a filter such as for example a finite impulse response filter, which may be windowed with a rectangular window of unity coefficients. This may result in certain values representative of changes between any calibration data and subsequent data. Such values may be compared against certain thresholds at 970, which may be stored or calculated in order to determine a condition of belt. An indication of belt condition may be represented as a warning, signal, information, data, and/or the like issued at 990 to any external device, any other component internal to system 100, any other component internal to belt monitor 140, or to any other user. If a warning is not warranted at 970, data acquisition process 800 continues.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
    a belt having at least one reinforcement member comprising a conductive reinforcement material;
    a belt monitor disposed in conjunction with said belt, said belt monitor comprising a field inductor excited by an applied signal; and
    means for monitoring an electrical characteristic of at least a portion of said field inductor as influenced by changes in the electrical properties of said conductive reinforcement member in order to determine a physical condition of said conductive reinforcement member and thereby monitor a physical characteristic of said belt, said means for monitoring comprises a sense inductor disposed adjacent to said field inductor; and
    said electrical characteristic of said field inductor is an impedance of said field inductor as manifested in said sense inductor.

2. The system according to claim 1 wherein said conductive reinforcement material comprises carbon fiber belt reinforcement.

3. The system according to claim 1 wherein said conductive reinforcement material is woven with a non-conductive reinforcement material.

4. The system according to claim 1 wherein said conductive reinforcement material is disposed integral to said belt.

5. The system according to claim 1 wherein said conductive reinforcement material is disposed on a least a portion of the exterior of said belt.

6. The system according to claim 1 wherein said conductive reinforcement material is disposed integral to a tooth on said belt.

7. The system according to claim 1 wherein said reinforcement member is disposed longitudinally along at least a portion of said belt.

8. The system according to claim 1 wherein said reinforcement member is disposed transversely across at least a portion of said belt.

9. The system according to claim 1 wherein said field inductor comprises a conductive wire and a ferrite core.

10. The system according to claim 1 wherein said field inductor generates an electromagnetic field as a result of application of said applied signal.

11. The system of claim 1 wherein said field inductor and said sense inductor share a common core.

12. The system according to claim 1 wherein a second electrical characteristic of said field inductor is the phase difference between voltage and current flowing in said field inductor.

13. The system according to claim 1 wherein a second electrical characteristic of said field inductor is the magnitude of magnetic flux in said field inductor.

14. The system according to claim 1 wherein a second electrical characteristic of said field inductor is the change in waveform symmetry of the voltage in said field inductor.

15. The system according to claim 1 wherein a second electrical characteristic of said field inductor is the magnitude of current flowing in said field inductor.

16. The system according to claim 1 wherein said applied signal is a voltage signal.

17. The system according to claim 1 wherein said belt is from the group consisting of a timing belt, an accessory drive belt, a carbon continuously variable transmission belt, a carbon v-belt, a fan belt, a carbon thermoplastic polyurethane belt, long length belting, a static machine belt, and a conveyor belt.

* * * * *